UNITED STATES PATENT OFFICE.

JOHN E. EASTWICK, OF PHILADELPHIA, PENNSYLVANIA.

PROCESS FOR REVITALIZING DISCARDED PLASTER-OF-PARIS.

No. 898,451.        Specification of Letters Patent.        Patented Sept. 15, 1908.

Application filed April 13, 1907. Serial No. 367,949.

*To all whom it may concern:*

Be it known that I, JOHN E. EASTWICK, a citizen of the United States, residing at Philadelphia, in the county of Philadelphia and State of Pennsylvania, have invented certain new and useful Improvements in Processes for Revitalizing Discarded Plaster-of-Paris, of which the following is a specification.

My invention has for its object to provide for revitalizing plaster of paris, that is to render the same, after having been previously utilized or discarded, capable of being re-used which is a desideratum in the use of this material, especially in view of the great waste attending such use as now experienced.

In carrying out my invention, I may take old molds, casts and the like of plaster of paris which material contains about 20% of water of crystallization and about the same proportion of saline water. This material so constituted is then broken up into small pieces and put into a drier, whereby the water of crystallization is driven off and about one-half of the saline water. This saline water is the water absorbed by the foreign salts contained in the material. The latter are then immersed in a liquid or solution of sulfuric acid, ground alum and water, in the proportions of a half (½) gill of the sulfuric acid 66% pure, four (4) ounces of the alum and one (1) gallon of water. In mixing this solution I find it preferable to let the acid soak in water a few hours so that the lead will precipitate to the bottom, and then the acid at the top is poured off into the alum and water solution. After having been thoroughly saturated in this solution, say about two (2) hours, said pieces of plaster of paris are removed therefrom and placed in a suitable kiln for properly calcining or drying such plaster of paris pieces, after which they are suitably pulverized and the resulting product is ready for placing on the market for sale. The user, of course, will suitably gage the material with water in the usual way of converting it into a plastic condition as in utilizing or employing the same in the arts or for the intended purpose. This has proven by practical experience to effect the re-vitalizing of plaster of paris as such, which has been previously used, whereby much wasted or discarded material of this character may be re-converted and appropriated for re-using as will be appreciated.

In cases when it may be desired to obtain a plaster which may set very slowly but which shall obtain a greater hardness than ordinary plaster, this may be effected by dissolving one (1) pound of ground glue in the water with which this composition may be gaged.

I claim—

1. A herein described process of treating waste hydrated sulfate of lime, which consists in first drying it and then saturating it in a solution of sulfuric acid, alum and water, and then calcining said material.

2. A herein described process of treating waste hydrated sulfate of lime, which consists in drying it in broken up form and then saturating it in a solution of sulfuric acid, alum and water, and then calcining said material.

3. A process of treating waste hydrated sulfate of lime, which consists in first partially drying the pieces, then saturating said pieces in a solution of sulfuric acid, alum and water, and then placing the material in a kiln and calcining.

4. A herein described process of treating waste hydrated sulfate of lime, which consists in drying the pieces of waste material and causing the water of crystallization to be driven therefrom and a portion of the saline water, and then saturating the material in a solution of sulfuric acid, ground alum and water, and then placing the material in a kiln and calcining.

5. A process of treating waste hydrated sulfate of lime, which consists in first drying it and then saturating it in a solution of sulfuric acid, alum, water and glue, and then calcining said material.

In testimony whereof I affix my signature, in presence of two witnesses.

JOHN E. EASTWICK.

Witnesses:
BENNETT S. JONES.
J. WM. MISTER.